United States Patent
Prakah-Asante et al.

(10) Patent No.: US 10,220,851 B2
(45) Date of Patent: Mar. 5, 2019

(54) INFRASTRUCTURE-CENTRIC VEHICLE MODE SELECTION

(71) Applicant: Ford Global Technologies, LLC, Dearborn, MI (US)

(72) Inventors: Kwaku O. Prakah-Asante, Commerce Township, MI (US); Donnell Matthew Washington, Northville, MI (US); Finn Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/379,039

(22) Filed: Dec. 14, 2016

(65) Prior Publication Data

US 2018/0162399 A1 Jun. 14, 2018

(51) Int. Cl.
*B60W 30/182* (2012.01)
*B60W 50/00* (2006.01)

(52) U.S. Cl.
CPC ...... *B60W 30/182* (2013.01); *B60W 50/0098* (2013.01); *B60W 2510/20* (2013.01); *B60W 2550/40* (2013.01)

(58) Field of Classification Search
CPC .................. B60W 30/182; B60W 50/0098
See application file for complete search history.

(56) References Cited

U.S. PATENT DOCUMENTS

| | | | |
|---|---|---|---|
| 8,880,237 B2* | 11/2014 | Boss | G06F 19/00 701/1 |
| 9,170,770 B2 | 10/2015 | Murofushi | |
| 9,550,497 B2* | 1/2017 | Jeon | B60W 30/182 |
| 2011/0307130 A1 | 12/2011 | Gow et al. | |
| 2014/0253345 A1 | 9/2014 | Breed | |
| 2015/0210290 A1 | 7/2015 | Hemes et al. | |
| 2016/0229252 A1 | 8/2016 | Lu et al. | |
| 2017/0267238 A1 | 9/2017 | Mimura et al. | |
| 2017/0341654 A1 | 11/2017 | Prakah-Asante et al. | |
| 2018/0004210 A1* | 1/2018 | Iagnemma | G05D 1/0212 |

FOREIGN PATENT DOCUMENTS

| | | | |
|---|---|---|---|
| DE | 102011116184 A1 | 4/2013 | |
| DE | 102014218905 A1 | 3/2015 | |
| DE | 102014215259 A1 | 2/2016 | |
| DE | 102015011465 A1 | 5/2016 | |
| GB | 2523096 A * | 8/2015 | B60K 28/16 |

OTHER PUBLICATIONS

Search Report dated May 25, 2018 for Great Britain Patent Application No. GB 1720548.5. (4 Pages).

* cited by examiner

*Primary Examiner* — Todd M Melton
(74) *Attorney, Agent, or Firm* — James P. Muraff; Neal, Gerber & Eisenberg LLP

(57) ABSTRACT

Methods and apparatus are disclosed for infrastructure-centric vehicle mode selection. An example vehicle includes a GPS receiver to provide a location of the vehicle, memory storing instructions, and a processor. The example processor, when executing the instructions, causes the vehicle to (a) when the vehicle is in a vicinity of an infrastructure of interest, determine a low traction anomaly value, and (b) in response to the a low traction anomaly value satisfying a threshold, change a driving mode of the vehicle.

17 Claims, 4 Drawing Sheets

INFRASTRUCTURE-CENTRIC VEHICLE MODE SELECTION

TECHNICAL FIELD

The present disclosure generally relates to driving modes of a vehicle and, more specifically, infrastructure-centric vehicle mode selection.

BACKGROUND

Increasingly, vehicles are manufactured with different preset driving modes that emphasize different aspects of the driving experience, such as responsiveness, handling, and comfort, etc. To change modes, the vehicles change settings within drive-related electronic control units (ECUs). However, drivers do not always know which modes are good for which situations. As a result, the benefits of the different driving modes are often under realized.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Methods and apparatus are disclosed for infrastructure-centric vehicle mode selection. An example vehicle includes a GPS receiver to provide a location of the vehicle, memory storing instructions, and a processor. The example processor, when executing the instructions, causes the vehicle to (a) when the vehicle is in a vicinity of an infrastructure of interest, determine a low traction anomaly value, and (b) in response to the a low traction anomaly value satisfying a threshold, change a driving mode of the vehicle.

An example method to manage a driving mode of a vehicle includes, when the vehicle is in a vicinity of an infrastructure of interest, determining a low traction anomaly value. Additionally, in response to the a low traction anomaly value satisfying a threshold, the method includes changing a driving mode of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
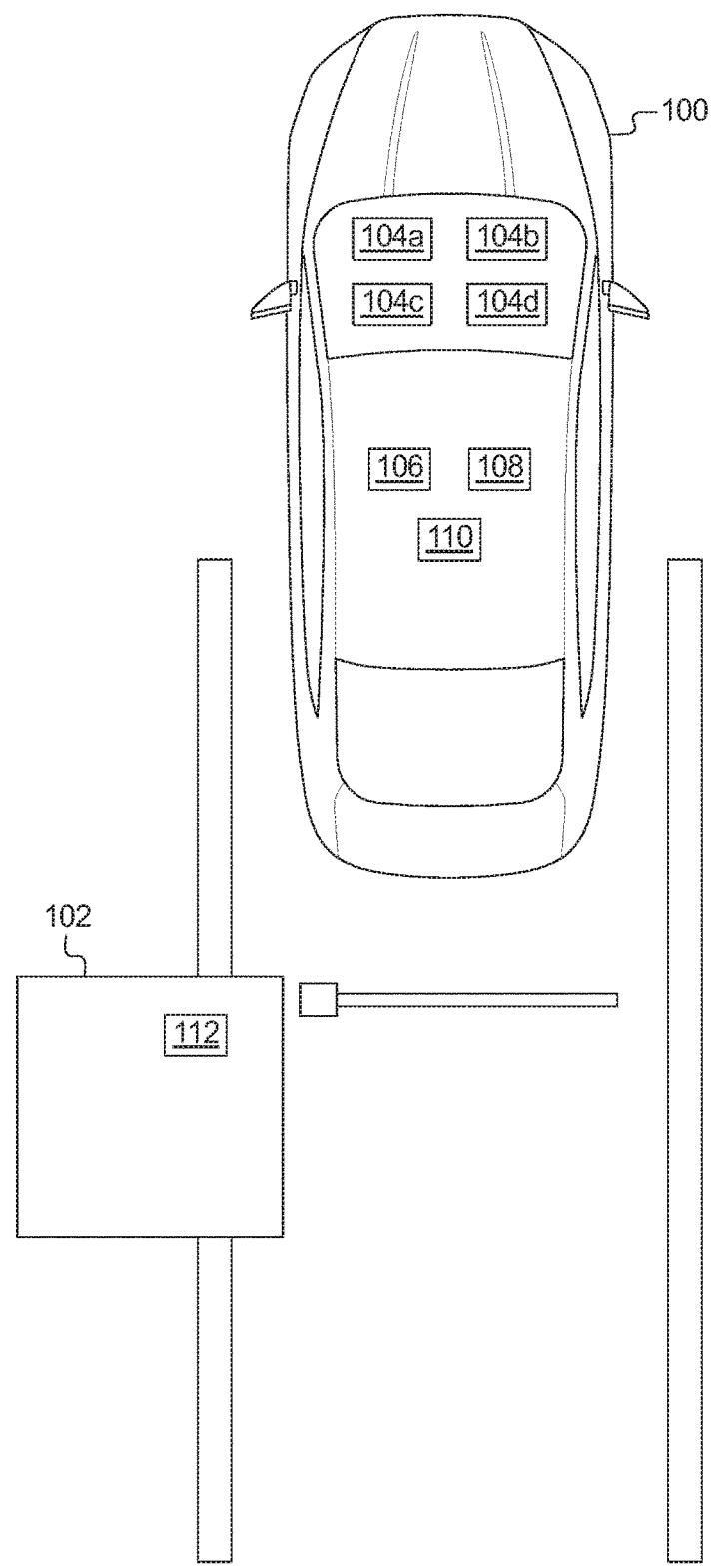
FIG. 1 illustrates a vehicle selecting a driving mode based on an infrastructure of interest in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle includes driving modes, such as a comfort mode, a sport mode, an off-road mode, and/or a stability mode, etc. These driving modes emphasize different aspects of driving. The vehicle changes the driving modes by changing settings of electronic control units (ECUs). For example, different driving modes may have different power steering responsiveness, different acceleration profiles, different suspension settings, and/or different stability control settings, etc. Drivers may choose the different driving modes based on preference. Additionally, different driving modes are advantageous in different situations. For example, when merging into traffic after a tollbooth, the acceleration profile and acceleration pedal responsiveness of a sport driving mode may be desirable.

As disclosed below, the vehicle monitors its location to determine whether the vehicle is in a vicinity of an infrastructure of interest (e.g., a tollbooth, a bridge, a tunnel, an on-ramp, an exit ramp, etc.). When the vehicle is in the vicinity of the infrastructure of interest, the vehicle detects whether a low traction anomaly is detected. The low traction anomaly characterizes a value for situations where the vehicle deviates from a driver's intended actions or desired path as a result of slippery road conditions. The low traction anomaly includes a measurement of a longitudinal traction anomaly (LTA) (sometimes referred to as a "longitudinal traction anomaly value") and a measurement of a lateral anomaly (LRA) (sometimes referred to as a "lateral anomaly value"). The longitudinal traction anomaly is a value that characterizes an aggregation of traction control system (TCS) alerts activated over a period of time. The vehicle TCS alert is activated when the traction control system detects slippery conditions (e.g., loss of traction on one or more wheels, etc.). The lateral anomaly is a value that characterizes the deviation of a vehicle from a driver's desired path. The lateral anomaly represents a deviation from a driver's desired path (e.g., as determined by a model-based yaw-rate prediction) compared to a yaw-rate measured by a yaw rate sensor wherein the difference is attributable to a loss of traction. When the low traction anomaly is less than a threshold, the vehicle determines a driving mode (e.g., sport mode, a traction control mode, etc.). In some examples, the vehicle presents the determined driving mode to the driver and prompts the driver to accept or reject transitioning into the recommended driving mode. Additionally or alternatively, in some examples, the driver switches mode transitions to be automatic. In such examples, the vehicle transitions into the recommended driving mode without prompting the driver to accept or reject the recommendation.

FIG. 1 illustrates a vehicle 100 selecting a driving mode based on an infrastructure of interest 102 in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a driveshaft, a suspension, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes electronic control units (ECUs) 104a-104d, a global positioning system (GPS) receiver 106 (to provide coordinates of the vehicle 100), and a driving mode manager 108. In some examples, the vehicle also includes communication module 110.

The ECUs 104a-104d monitor and control the subsystems of the vehicle 100. The ECUs 104a-104d communicate and exchange information via a vehicle data bus (e.g., the vehicle data bus 308 of FIG. 3 below). Additionally, the ECUs 104a-104d may communicate properties (such as, status of the ECU 104a-104d, sensor readings, control state, error and diagnostic codes, etc.) to and/or receive requests from other ECUs 104a-104d. Some vehicles 100 may have seventy or more ECUs 104a-104d located in various locations around the vehicle 100 communicatively coupled by the vehicle data bus 308. The ECUs 104a-104d are discrete sets of electronics that include their own circuit(s) (such as integrated circuits, microprocessors, memory, storage, etc.) and firmware, sensors, actuators, and/or mounting hardware.

In the illustrated example, the ECUs 104a-104d include a power train control unit 104a, a steering control unit 104b, a suspension control unit 104c, and a traction control system 104d. The power train control unit 104a facilitates coordination between motive subsystems of the vehicle 100, such as the engine, transmission, and/or driveshaft. In some examples, power train control unit 104a includes an engine control unit to monitor and control parameters of the engine (e.g., variable cam timing, ignition timing, RPM limiting, etc.), and the transmission control unit to control the transmission (e.g., determine when to change gears in the vehicle for fuel economy and shift quality, etc.). The steering control unit 104b assists the driver to reduce the effort required to turn the steering wheel of the vehicle 100 and measures the angle of the steering wheel. The suspension control unit 104c controls the height and stiffness of the suspension of the vehicle 100. The traction control system 104d detects when one or more wheels of the vehicle 100 lose traction with the surface of the road. For example, when the vehicle 100 loses traction, one or more wheels of the vehicle may spin at different speeds. When the traction control system 104d detects a loss of traction, the traction control system 104d produces a traction control system (TCS) alert. Additionally, the traction control system 104d performs countermeasures (e.g., braking, closing a throttle, etc.) to correct the loss of traction.

The driving mode manager 108 recommends and/or implements a transition to a driving mode based on being in the vicinity of the infrastructure of interest 102. The driving modes are a collection of settings for the ECUs 104a-104d to change the driving performance of the vehicle 100. The driving modes may include, for example, a sport mode that changes the responsiveness of the steering wheel (e.g., the steering control unit 104b) and the acceleration profile (e.g., via the power train control unit 104a).

As disclosed in more detail in FIG. 2 below, the driving mode manager 108 determines whether the vehicle 100 is in the vicinity of the infrastructure of interest 102. The driving mode manager 108 determines the coordinates of the vehicle 100 via the GPS receiver 106. In some examples, the driving mode manager 108 determines the coordinates of the infrastructure of interest 102 from navigation data received from a navigation system. Alternatively or additionally, in some examples, the driving mode manager 108 communicatively couples to a beacon 112 installed on the infrastructure of interest 102 via the communication module 110. In such examples, the driving mode manager 108 receives the coordinates of the infrastructure of interest 102 from the beacon 112. When the vehicle 100 is within the vicinity of infrastructure of interest 102, the driving mode manager 108 determines a value characterizing the low traction anomalies being experienced by the vehicle 100. If the value satisfies (e.g., is less than) an anomaly threshold, the driving mode manager 108 recommends and/or implements a driving mode. In some examples, the recommended driving mode is based on the infrastructure of interest 102. For example, if the infrastructure of interest 102 is a toll booth, the recommended driving mode may be a sports mode (with an increased acceleration profile, etc.) and if the infrastructure of interest 102 is a bridge, the recommended driving mode may in a winter mode (with an increase stability profile, etc.). In some examples, a driver sets a preference (e.g., via the infotainment head unit 302 below) for whether the driving mode manager 108 is to transition to the recommended driving mode without further driver intervention.

The communication module 110 includes wireless network interfaces to enable communication with external networks. The communication module 110 also includes hardware (e.g., processors, memory, storage, antenna, etc.) and software to control the wireless network interfaces. In the illustrated example, the communication module 110 includes one or more wireless communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols.

Figure 2:
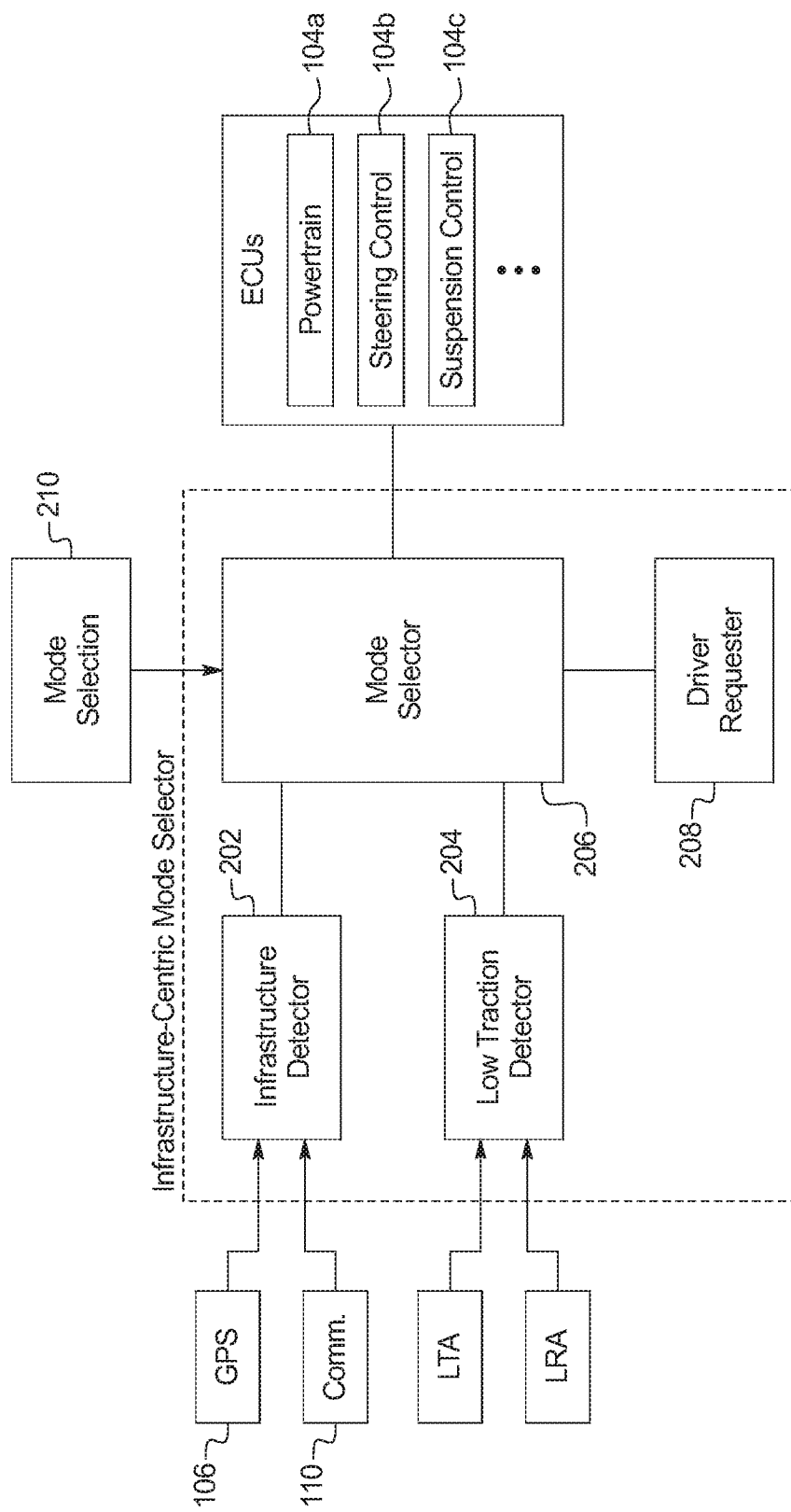
FIG. 2 is a block diagram of the driving mode manager of the vehicle of FIG. 1.

FIG. 2 is a block diagram of the driving mode manager 108 of the vehicle 100 of FIG. 1. In the illustrated example, the driving mode manager 108 includes an example infrastructure detector 202, an example low traction detector 204, an example mode selector 206, and example driver requestor 208.

The example infrastructure detector 202 determines when the vehicle 100 is in the vicinity of the infrastructure of interest 102 based on the coordinates of the vehicle 100 (e.g., from the GPS receiver 106) and the coordinates of the infrastructure of interest 102. In some examples, the driving mode manager 108 determines the coordinates of the infrastructure of interest 102 from navigation data received from a navigation system. Alternatively or additionally, in some examples, the driving mode manager 108 communicatively couples to a beacon 112 installed on the infrastructure of interest 102 via the communication module 110. In such examples, the driving mode manager 108 receives the coordinates of the infrastructure of interest 102 from the beacon 112. In some examples, the infrastructure detector 202 determines that the vehicle 100 is in the vicinity of the infrastructure of interest 102 in accordance with Equation (1) below.

$$V(GPS_{LAT}, GPS_{LONG}) = 1/(GPS_{LAT}, GPS_{LONG}) \pm \alpha \quad \text{Equation (1)}$$

In Equation (1) above, $V(GPS_{LAT}, GPS_{LONG})$ is the latitudinal coordinate and longitudinal coordinates of the vehicle 100, $(GPS_{LAT}, GPS_{LONG})$ is the latitudinal coordinate and longitudinal coordinates of the infrastructure of interest 102, and a is constant that accounts for the inaccuracy of the GPS receiver 106.

The low traction detector 204 determines the value representative of the low traction anomaly based on a value of the longitudinal traction anomaly (LTA) and a value of the lateral anomaly (LRA). The LTA incorporates accumulators to track activation of the TCS alert. The TCS alert is obtained from the vehicle data bus (e.g., the vehicle data bus 308 of FIG. 3 below). In some examples, the LTA from has a value between zero and one (e.g., capped at one). Values closer to one are indicative of an increased likelihood of slippery conditions and values closer to zero are indicative of a decreased likelihood of lower slippery conditions. The LTA value is re-set to zero after a period of time (e.g., every two to three minutes, etc.). In some examples, the value of the longitudinal traction anomaly (LTA) is determined in accordance with Equation (2) below.

$$\text{LAT }(k) = \text{LTA}(k-1) + e \quad \text{Equation (2)}$$

In Equation (2) above, LAT(k) is the current LTA, LAT(k−1) is the pervious value of the LTA, and e is an incremental value. In some examples, e is 0.25. When e is higher, fewer TCS alters cause the low traction detector 204 to determine that the roadway is exhibiting slippery conditions. In some examples, the LRA is calculated based on Equation (3) below.

$$LRA = \frac{\text{abs}(L_{DES} - L_{PRED})}{\gamma} \quad \text{Equation (3)}$$

In Equation (3) above, abs( ) is the absolute value function, $L_{DES}$ is a measured yaw-rate (e.g., measured by a yaw-rate sensor), $L_{PRED}$ is a model-based prediction of the yaw rate of the vehicle 100 based on input from the steering wheel, and $\gamma$ is a scaling factor that scales the LRA to be between one and zero. The low traction detector 204 determines the value representative of the low traction anomaly to be the maximum of the LTA or the LRA.

The mode selector 206 determines whether the vehicle 100 should transition into another driving mode. When the vehicle 100 is in the vicinity of the infrastructure of interest 102 (as determined by the infrastructure detector 202), the mode selector 206 determines whether the value representative of the low traction anomaly satisfies (e.g., is less than) the anomaly threshold. If the value representative of the low traction anomaly satisfies the anomaly threshold, the mode selector 206 determines a recommendation for a driving mode. In some examples, the mode selector 206 includes a lookup table that associates types of infrastructure of interest 102 with driving modes. For example, the look-up table may associate tollbooths with sport mode. Alternatively or additionally, in some examples, the mode selector 206 receives, via the communication module 110, a recommended driving mode from the facility of interest 102. In some examples, the mode selector 206 receives a mode selection 210 that indicates whether the driver prefers manual mode or automatic mode. If the mode selection 210 indicates the automatic mode, the mode selector 206 communicates with the ECUs 104a-104d to change their settings according to the recommended driving mode. If the mode selection 210 indicates the manual mode, the driver requestor 208 prompts (e.g., via the infotainment head unit 302 of FIG. 3 below) the driver to accept the recommended driving mode. In response to the driver accepting the recommended driving mode, the mode selector 206 communicates with the ECUs 104a-104d to change their settings according to the recommended driving mode.

Figure 3:
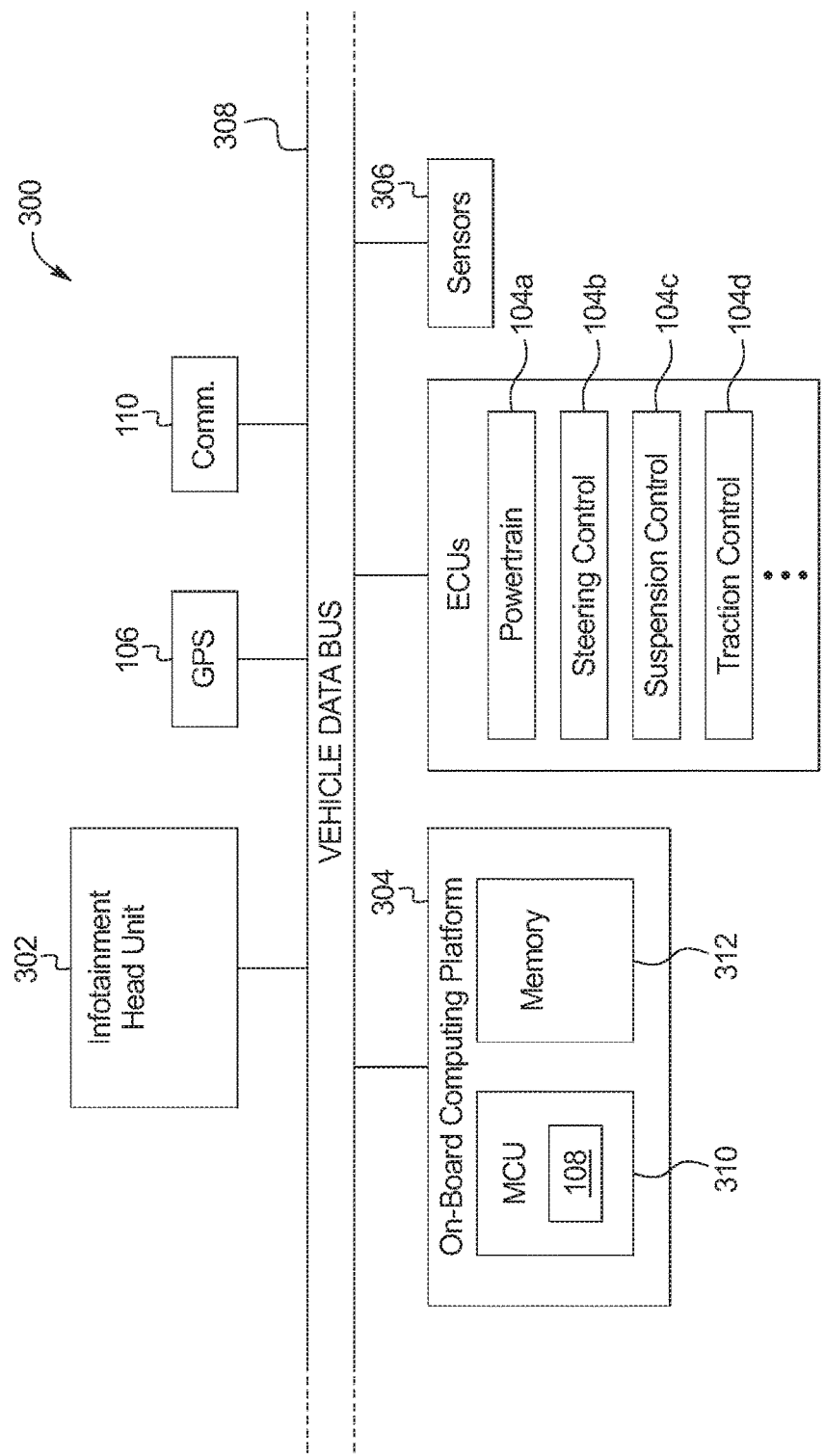
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the ECUs 104a-104d, the GPS receiver 106, the communication module 110, an infotainment head unit 302, an on-board computing platform 304, sensors 306, and a vehicle data bus 308.

The infotainment head unit 302 provides an interface between the vehicle 100 and a user. The infotainment head unit 302 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 302 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 302 displays the infotainment system on, for example, the center console display. In some examples, the driver requestor 208 prompts the driver via one of the output devices and receives confirmation or rejection of the driving mode via the input devices.

The on-board computing platform 304 includes a processor or controller 310 and memory 312. In the illustrated example, the on-board computing platform 304 is structured to include driving mode manager 108. Alternatively, in some examples, the driving mode manager 108 may be incorporated into another electronic control unit (ECU) with its own processor and memory, such as the power train control unit 104a. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 306 may be arranged in and around the vehicle 100 in any suitable fashion. The sensors 306 may be mounted to measure properties around the exterior of the vehicle 100. Additionally, some sensors 306 may be mounted inside the cabin of the vehicle 100 or in the body of the vehicle 100 (such as, the engine compartment, the wheel wells, etc.) to measure properties in the interior of the vehicle 100. For example, such sensors 306 may include accelerometers, odometers, tachometers, pitch and yaw sensors, wheel speed sensors, microphones, tire pressure sensors, and biometric sensors, etc.

The vehicle data bus 308 communicatively couples the ECUs 104a-104d, the GPS receiver 106, the communication module 110, the infotainment head unit 302, and the on-board computing platform 304. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
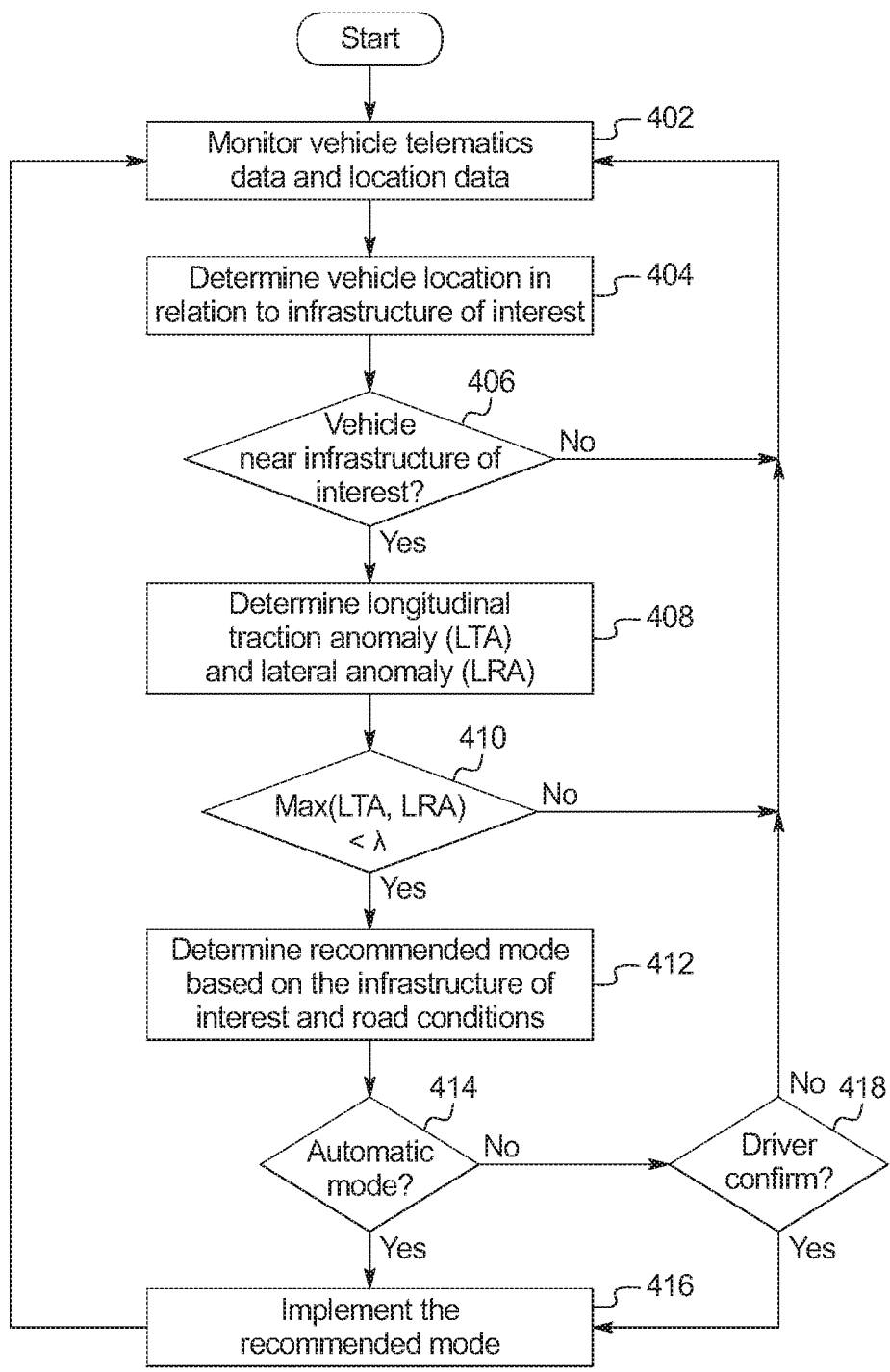
FIG. 4 is a flowchart of a method to select a driving mode based on the infrastructure of interest, which may be implemented by the electronic components of FIG. 3.

FIG. 4 is a flowchart of a method to select a driving mode based on the infrastructure of interest 102, which may be implemented by the electronic components 300 of FIG. 3. Initially, at block 402, the infrastructure detector 202 and the low traction detector 204 monitor vehicle telematics data (e.g., from the sensors 306) and location data (e.g., from the GPS receiver 106). At block 404, the infrastructure detector 202 determines whether the vehicle 100 is in the vicinity of the infrastructure of interest 102. In some examples, the infrastructure detector 202 determines whether the vehicle 100 is in the vicinity of the infrastructure of interest 102 in accordance with Equation (1) above. At block 406, if the vehicle 100 is in the vicinity of the infrastructure of interest 102, the method continues to block 408. Otherwise, if the vehicle 100 is not in the vicinity of the infrastructure of interest 102, the method returns to block 402.

At block 408, the low traction detector 204 determines the value of the longitudinal traction anomaly (LTA) and the value of the lateral anomaly (LRA). In some examples, the low traction detector 204 determines the value of the longitudinal traction anomaly (LTA) in accordance with Equation (2) above. In some examples, the low traction detector 204 determines the value of the lateral anomaly (LRA) in accordance with Equation (3) above. At block 410, the mode selector 206 determines whether the maximum of the LTA or the LRA satisfies (e.g., is less than) the anomaly threshold ($\lambda$). If the maximum of the LTA or the LRA satisfies the anomaly threshold ($\lambda$), the method continues to block 412. Otherwise, if the maximum of the LTA or the LRA does not satisfy the anomaly threshold ($\lambda$), the method returns to block 402.

At block 412, the mode selector 206 determines a recommended driving mode based on the infrastructure of interest 102 and/or the road conditions. At block 414, the mode selector 206 determines whether the driver has selected the automatic mode (as indicated by the mode selection 210). If the driver has selected the automatic mode, the method continues to block 416. Otherwise, if the driver has selected the manual mode, the method continues to block 418. At block 416, the mode selector 206 communicates settings to the ECUs 104a-104d to change the driving mode. At block 418, the driver requestor 208 determines whether the driver has confirmed the recommended driving mode. If the driver confirms the recommended driving mode, the method continues to block 416. Otherwise, if the driver does not confirm the recommended driving mode, the method returns to block 402.

The flowchart of FIG. 4 is representative of machine readable instructions stored in memory (such as the memory 312 of FIG. 3) that comprise one or more programs that, when executed by a processor (such as the processor 310 of FIG. 3), cause the vehicle 100 to implement the example driving mode manager 108 of FIGS. 1 and 2. Further, although the example program(s) is/are described with reference to the flowchart illustrated in FIG. 4, many other methods of implementing the example driving mode manager 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   antennas;
   memory;
   a traction control system; and
   processors to:
      when the vehicle is in a vicinity of an infrastructure of interest, determine a low traction anomaly value based on a longitudinal traction anomaly value, the longitudinal traction anomaly value based on a number of alerts over a period from the traction control system; and responsive to the low traction anomaly value satisfying a threshold, change a driving mode of the vehicle.

2. The vehicle of claim 1, wherein the processors are to further determine the low traction anomaly value based on a lateral anomaly value.

3. The vehicle of claim 2, wherein the longitudinal traction anomaly value and the lateral anomaly value are numbers between zero and one.

4. The vehicle of claim 2, wherein the lateral anomaly value is based on a difference between a first yaw rate measured by a yaw rate sensor and a second yaw rate predicted based on input from a steering wheel of the vehicle.

5. The vehicle of claim 2, wherein the low traction anomaly value is the greater of the longitudinal traction anomaly value and the lateral anomaly value.

6. The vehicle of claim 1, wherein the memory stores a lookup table that associates the infrastructure of interest with the driving mode.

7. The vehicle of claim 1, includes a wireless communication controller to receive the driving mode from the infrastructure of interest.

8. The vehicle of claim 1, wherein the infrastructure of interest is a tollbooth, and the driving mode is a sport mode.

9. The vehicle of claim 1, wherein the longitudinal traction anomaly value is a sum of a previous longitudinal traction anomaly value and an incremental value, the incremental value being proportional to the number of alerts.

10. A method to manage a driving mode of a vehicle comprising:

when the vehicle is in a vicinity of an infrastructure of interest, determining, with processors, a low traction anomaly value based on a longitudinal traction anomaly value, the longitudinal traction anomaly value based on a number of alerts over a period from a traction control system; and responsive to the low traction anomaly value satisfying a threshold, changing the driving mode of the vehicle.

11. The method of claim 10, further comprising determining the low traction anomaly value based on a lateral anomaly value.

12. The method of claim 11, wherein the low traction anomaly value is the greater of the longitudinal traction anomaly value and the lateral anomaly value.

13. The method of claim 11, wherein the longitudinal traction anomaly value and the lateral anomaly value are numbers between zero and one.

14. The method of claim 11, wherein the lateral anomaly value is based on a difference between a first yaw rate measured by a yaw rate sensor and a second yaw rate predicted based on input from a steering wheel of the vehicle.

15. The method of claim 10, including retrieving, from memory, a lookup table that associates a type of the infrastructure of interest with the driving mode.

16. The method of claim 10, including receiving, via a wireless communication controller, the driving mode from the infrastructure of interest.

17. The method of claim 10, wherein the infrastructure of interest is a tollbooth, and the driving mode is a sport mode.

* * * * *